United States Patent [19]

Kwon et al.

[11] Patent Number: 5,468,529
[45] Date of Patent: Nov. 21, 1995

[54] MAGNETIC FILTER MATERIAL COMPRISING A SELF-BONDING NONWOVEN FABRIC OF CONTINUOUS THERMOPLASTIC FIBERS AND MAGNETIC PARTICULATE WITHIN THE FIBERS

[75] Inventors: Oh K. Kwon; Ung S. Choi, both of Seoul; Ki Y. Choi, Kyeongsangbuk, all of Rep. of Korea; N. K. Mishkin, Gomel, Belarus; Yoon M. Jung, Kyeongsangbuk, Rep. of Korea

[73] Assignee: Korea Institute of Science and Technology, Seoul, Rep. of Korea

[21] Appl. No.: 371,686

[22] Filed: Jan. 12, 1995

Related U.S. Application Data

[63] Continuation-in-part of Ser. No. 67,972, May 27, 1993, abandoned.

[30] Foreign Application Priority Data

Aug. 28, 1992 [KR] Rep. of Korea ............. 92-15606

[51] Int. Cl.$^6$ .................. B01D 39/02; B01D 24/00; D04H 1/04; B32B 5/16
[52] U.S. Cl. .................. 428/36.1; 55/522; 55/527; 210/503; 210/505; 428/36.4; 428/283; 428/296; 428/900; 428/903
[58] Field of Search .................. 428/283, 288, 428/900, 903, 296, 36.1, 372, 36.4; 210/503, 505; 55/100, 522, 527

[56] References Cited

U.S. PATENT DOCUMENTS

| | | | |
|---|---|---|---|
| 2,959,832 | 11/1960 | Baermann | 428/900 |
| 3,051,988 | 9/1962 | Baermann | 428/900 |
| 3,126,924 | 3/1964 | Kirkpatrick | 428/900 |
| 3,136,720 | 6/1964 | Baermann | 428/900 |
| 3,523,074 | 8/1970 | Geyer et al. | |
| 3,850,600 | 11/1974 | Monstead, Jr. | |
| 4,193,866 | 3/1980 | Slusarczuk et al. | |
| 4,361,619 | 11/1982 | Forsten et al. | |

FOREIGN PATENT DOCUMENTS

| | | |
|---|---|---|
| 0265389 | 4/1988 | European Pat. Off. |
| 1362375 | 8/1974 | United Kingdom |

*Primary Examiner*—James D. Withers
*Attorney, Agent, or Firm*—Oblon, Spivak, McClelland, Maier, & Neustadt

[57] ABSTRACT

A magnetic filter material is disclosed. The filter material according to the present invention comprises a spray-spun, self-bonded, nonwoven fibrous structure consisting essentially of 40 to 99% by weight of a polymer selected from the group consisting of polycarbonate, polyethylene, polypropylene, polyamide, polyimide, polyester, polytetrafluoroethylene and polyacrylonitrile and 1 to 60% by weight of a magnetic substance selected from the group consisting of barium ferrite, strontium ferrite and samarium-cobalt.

The magnetic filter material of the present invention shows excellent filtration efficiency of metal impurities such as iron, iron oxides, and other metal dusts due to have a dual function by physical porosity and magnetic attraction, and thus is suitable as an air and oil filter medium for automobiles and other industrial machinery, a liquid filter medium for treating industrial waste water and oil, a filter medium in dust collecting and air-conditioning systems, and so forth.

6 Claims, 3 Drawing Sheets

MAGNETIC FILTER MATERIAL COMPRISING A SELF-BONDING NONWOVEN FABRIC OF CONTINUOUS THERMOPLASTIC FIBERS AND MAGNETIC PARTICULATE WITHIN THE FIBERS

This application is a Continuation-in-Part of U.S. Ser. No. 08/067,972 filed May 27, 1993 now abandoned incorporated herein by reference.

BACKGROUND OF THE INVENTION

1. Field of the Invention

The present invention relates to a magnetic filter material useful for a filtering system. More particularly, the present invention relates to a magnetic filter material which is made of a spray-spun, self-bonded, nonwoven structure comprising randomly arranged substantially continuous fibrous material consisting essentially of a polymer and magnetic substance, and which shows excellent filtration efficiency of metal impurities including especially iron components contained in gas or liquid.

2. Description Of The Prior Art

Conventionally, filtering systems refer to those which are installed in the flow path of fluids and act to remove impurities contained in the fluids. In these filtering systems, filter media have been used as an essential element.

A wide variety of materials have been used as such filter media, and these materials include synthetic fibers made of polymers such as polyethylene, polypropylene, etc., glass fibers, cottons, cellulose, iron wire, and pulp. These filter materials are conventionally manufactured in the form of woven fabrics, cartridges, nonwoven fabrics, pleated papers, and so forth.

For example, U.S. Pat. No. 4,361,619 to Forsten discloses a composite filter felt comprised of an intimate blend of PTFE and glass fibers. However, the filter media of this type suffer from the disadvantage that the limited filtration area and porosity thereof reduce the filtration efficiency significantly.

Other types of filter media comprised of glass fibers, synthetic fibers, metal fibers, and so on, in the form of woven or nonwoven fabrics, have been known conventionally, but they have encountered similar problems causing reduced filtration efficiency.

As an attempt to enhance filtration efficiency, a method has been suggested to increase the thickness of filter media. This method could increase the filtration efficiency to some extent. However, if the filter media become larger in thickness, the pressure difference between the inlet and outlet of the media through which filtrates pass increases considerably owing to the media having only a limited capacity to accumulate contaminants, resulting in the filtrates being drawn back and the filter media being destroyed.

Filter media made of pulp materials have been widely used attributing to the large filtration area thereof. However, filter media of this type have a little trap which serves as a space for accumulating the impurities, unlike the woven or nonwoven fabrics made of synthetic fibers. For this reason, it may cause the drawback of a pressure difference, that is, an increase in the difference between the inlet and outlet pressures, and this degrades the filtration efficiency. These problems become serious when the filter material is used as an oil filter medium for a lubricating system. Lubricating oils usually contain an amount of high-molecular polymer additives, such as viscosity improvers and pour point depressants, in addition to impurities. Therefore, when circulating the oils through the filter medium, the pores of the medium may be clogged thereby resulting in an increased pressure difference between the inlet and the outlet of the medium, and in its lower filtration efficiency.

As mentioned above, the filtration efficiency of the filter media depends largely on the porosity thereof. That is, when the filtrate passes through a filter medium, a pressure difference between the inlet and the outlet is created at the outset depending on the porosity of the medium. The difference is likely to increase with the decrease in the porosity.

If the pressure difference becomes higher than a given level, the filtration efficiency is reduced abruptly causing various problems. For example, in the case of a by-pass system in which a portion of the filtrate is by-passed, the impurities are circulated along the flow path within the facility equipped with the system. Meanwhile, in the case of an all-pass system, the impurities contained in the filtrate are accumulated in the filter medium to increase the pressure difference. The greatly increased pressure difference leads to lower filtration efficiency and rupture of the filter media as well as shortness of the cyclic life.

A number of methods have been hitherto suggested in attempt to resolve the above prior art problems.

In an representative example of these methods, an electric charge is applied to a filter medium. For example, U.S. Pat. No. 3,850,600 to Monsted, Jr. discloses a filter medium comprised of synthetic fibers in admixture with resin particles which were electrically charged by a mechanical working. Japanese Laid-Open Patent Publication No. (sho)59-145013 discloses a filter medium which comprises three kinds of polyesters having different melting points and to which an electric charge is applied by heating them under pressure.

Another approach is a method of removing impurities utilizing a magnetic field, as disclosed in U.S. Pat. No. 4,193,866 to Slusarczuk et al. According to this method, suspended impurities are flocculated by adding magnetic ferrite powder, and the flocculated impurities are then separated off in the magnetic field.

By the utilization of these filter medium and systems, filtration efficiency could be more or less increased as compared with the conventional ones. However, the costs of the installation, manufacturing and maintenance thereof are too expensive.

We, the inventors of the present invention, have intensively conducted a wide range of experiments in order to solve the problems encountered in conventional filtering systems. As a result, the inventors have discovered that by spray-spinning-extruding a mixture of a polymer and a magnetic substance to provide self-bonded, nonwoven fibrous structure comprising randomly arranged continuous fibrous material, and forming into a sheet or cylinder, and then magnetizing, the filtration efficiency of the resulting filter material can be enhanced considerably because of the dual function of filtration provided by the ferrous and non-ferrous particles by physical porosity and magnetic attraction, and could accomplish the present invention.

SUMMARY OF THE INVENTION

It is therefore an object of the invention to provide a filter medium which shows an enhanced filtration efficiency against both liquid and gas.

It is another object of the invention to provide a filter medium which is of commercial interest attributing to its economically viable costs.

These and other objects of the invention will become apparent through reading the remainder of the specification, and can be accomplished by providing a novel magnetic filter material according to the invention, which is made of a spray spun, self-bonded, nonwoven structure comprising randomly arranged substantially continuous fibrous material, consisting essentially of 40 to 99% by weight of a polymer and 1 to 60% by weight of a magnetic substance.

BRIEF DESCRIPTION OF THE DRAWING

The present invention will be described in greater detail with reference to the accompanying drawings, wherein.

DETAILED DESCRIPTION OF THE INVENTION

According to the present invention, a magnetic filter material which is made of a novel self-bonded, nonwoven fibrous structure comprising randomly arranged substantially continuous fibrous material is provided, which essentially consists of 40 to 99% by weight of a polymer and 1 to 60% by weight of a magnetic substance. If the magnetic substance contains in excess of above 60% by weight, the resulting mixture shows poor extrudability when spray spinning. On the contrary, if the magnetic substance contains an amount of below 1% by weight, the resulting filter medium cannot be magnetically charged. The preferred magnetic filter material according to the present invention is composed of 60 to 98% by weight of the polymer and 2 to 40% by weight of the magnetic substance.

The polymers used for fiber-forming in the magnetic filter materials are known in the art and typically selected from the group consisting of the following polymers: polycarbonate, polyethylene, polypropylene, polyamide, polyimide, polyester, polytetrafluoroethylene, polyacrylonitrile, and the like. These materials are used in the form of powder and chip.

It is preferred to use the following polymers:

an aromatic polycarbonate having a molecular weight of 10,000 to 30,000;

a high-density polyethylene having a molecular weight of 10000 to 50,000 and a density of 0.94 to 0.96 g/cm$^3$;

polytetrafluoroethylene having a molecular weight of 500,000 to 3,000,000;

a polypropylene homopolymer having a molecular weight of 40,000 to 60,000 and a density of 0.94 g/cm$^3$;

polyamide including nylon 6 having a molecular weight of 1,000 to 5,000 and nylon 6.6 having a molecular weight of 10,000 to 50,000;

an aromatic polyimide having a molecular weight of 10,000 to 40,000;

polyester having a molecular weight of 15,000 to 45,000; and polyacrylonitrile having a molecular weight of 20,000 to 50,000.

The magnetic substances useful in the invention are also known in the art. Thus, all known magnetic substances may be used in the present invention. Preferably, a suitable magnetic substance is selected from the group consisting of barium-ferrite such as barium oxide-ferric oxide, strontium ferrite such as strontium oxide-ferric oxide, and rare earth metals such as samarium-cobalt.

These magnetic substances may be in either of an anisotropic or isotropic structure. The magnetic substances of anisotropic structure are preferred because they have a more powerful magnetic property. The particle size of the magnetic substances is preferably 0.5 to 30 μm in diameter.

Figure 1:
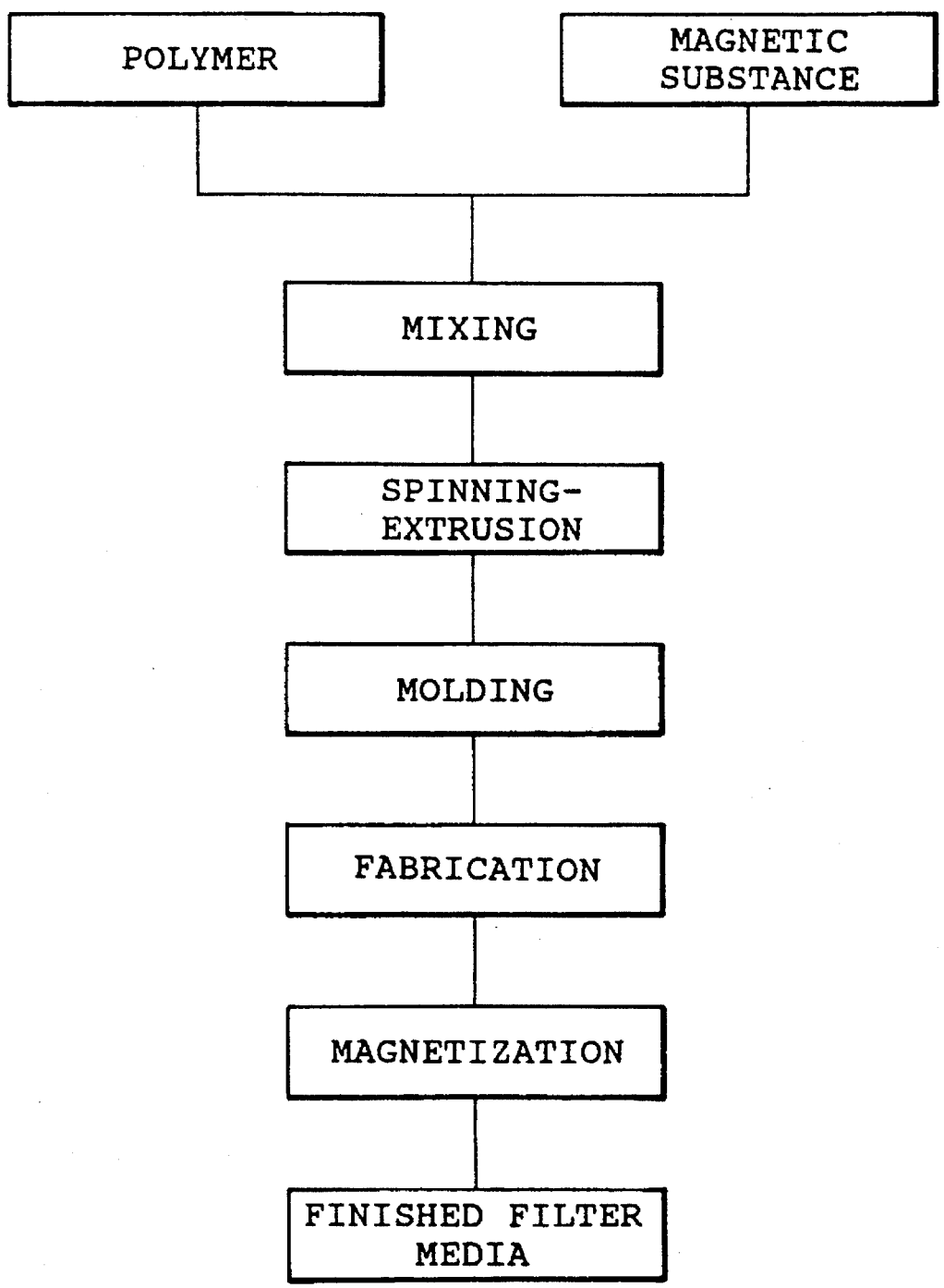
FIG. 1 is a flow diagram illustrating a process for preparing of the magnetic filter medium according to the invention.

Referring now to FIG. 1, the process for preparing of a magnetic filter medium according to the invention will be described hereinbelow in detail.

According to the invention, the raw materials, a polymer and a magnetic substance, are mixed in a formulated amount. The resulting mixture is spray spun over melting temperature of its polymer within a pneumatic melt extruder consisting of an extruder and spray head according to the well known spray spinning technique in which a continuous extrudate stream is attenuated by a plurality of gasous streams into a fine filament. The spray spun structure was collected onto planar or cylindrical collector for the forming of a sheet or cylinder, whose dimension can be controlled. During forming, at least one of the following operating conditions is varied one or more times: rotational frequencey of screw feeder of 10 to 50 rpm, spraying air temperature of 50° to 250° C., spraying air pressure of 5.0 to 50 jPa, and the distance between extruder and collector of 5.0 to 40 cm, and thereby it determines fiber size and desnity profile. The formed medium thus has size of the fibers of 0.01 to 1.0 mm in diameter and 0.1 to 0.8 gram per cubic centimeter in density profile, and it is fabricated into a desired size to produce a filter medium. The filter medium is then subject to magnetization by placing it in a magnetizer, the TEM-WV81C-254 which is commercially available from Toei Industry Co., Japan, to produce the finished filter medium having the desired magnetic properties.

The magnetic filter medium having a planar or cylindrical, self-bonded, nonwoven fibrous structure thus shows a magnetic force of 20 to 500 Gauss, and has a porosity of 0.1 to 200 μm.

The magnetic filter medium according to the invention has a new filtering mechanism incorporated the advantages of both depth filters and magnetic filters into a single unit, which enables the filters to have a dual action of filtration to the ferrous and non-ferrous particles by physical porosity and also magnetic attraction. By the reasons, it has a porosity similar to that of the prior art woven or nonwoven fabrics filters made only of pure polymers, but shows highly enhanced filtration efficiency. Accordingly, the magnetic filter medium of the invention can be successfully used in various fields of industry, for example, as either an air or oil filter for automobiles and other industrial machinery, a liquid filter for treating industrial waste water and oil, and an air filter for dust-collecting or air-conditioning systems.

The magnetic filter medium of the invention shows excellent filtration efficiency, especially against metal impurities including iron, iron oxides and other metal dust.

Figure 2:
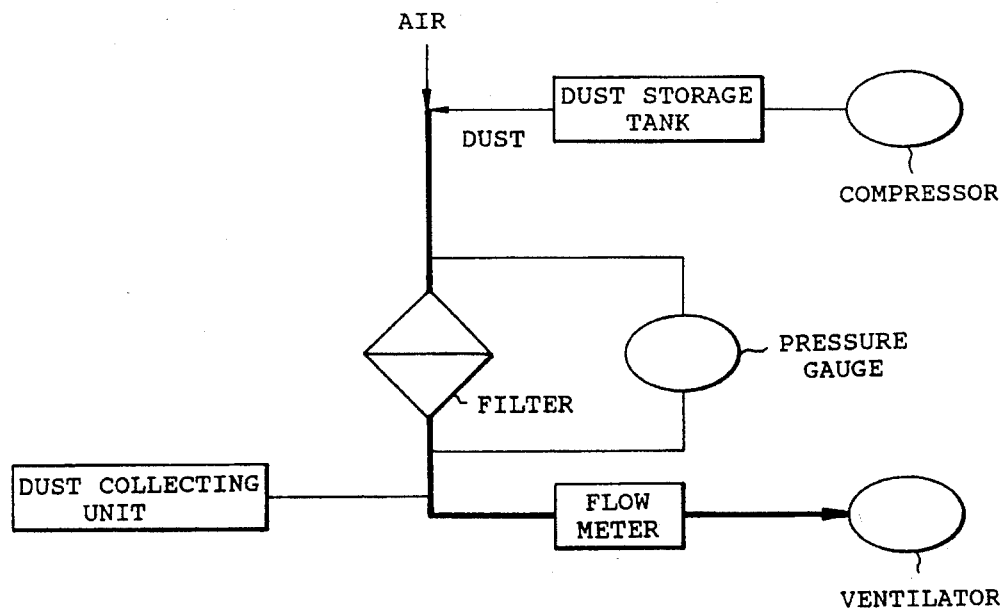
FIG. 2 is a schematic view showing the system of an air filter tester used in the invention.

In the following examples, a number of air and/or oil-filtering tests are performed to evaluate the filtration efficiency of the magnetic filter material of the invention. The air-filtering tests are carried out in accordance with the gravimetric method in which filtration efficiency is measured based on the amount of dust particles to be collected. An example of a tester employed for this test is depicted in FIG. 2. A certain amount of dust is supplied into the tester from a storage tank by operating a compressor. The dust is then mixed with air. The air-containing dust is passed through a filter and a flow meter in turn, and finally removed with the aid of a ventilator. Along the flow path, a dust collecting unit is installed behind the filter and before the flow meter to evaluate the efficiency of the filter in leakage percentage.

To determine the leakage percentage, fly ash as the dust is added to air and the mixture passes through the filter at an air velocity of 2.1 m/min and 4.6 m/min for 2 hours. After measuring the weight of the fly ash having passed the filter, the leakage percentage of the filter used is calculated according to the following equation:

$$\text{Leakage Percentage} = \frac{\text{Weight of fly ash passing through the filter}}{\text{Weight of fly ash fed}} \times 100$$

Figure 3:
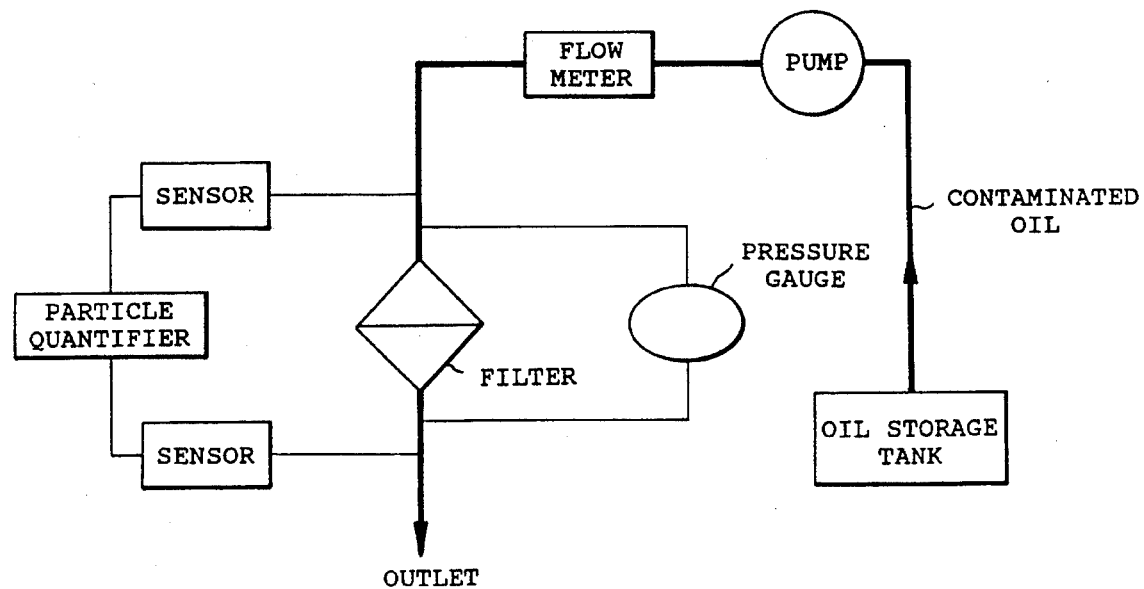
FIG. 3 is a schematic view showing the system of an oil filter tester used in the invention.

The oil-filtering test is performed according to a standard testing method prescribed by the Society of Automotive Engineers (SAE HS J806 Method). The schematic diagram of the tester is shown in FIG. 3. In this tester, the contaminated oil is circulated into a filter via a flow meter, and then removed. A set of pressure gauges and a particle quantifier equipped with suitable sensors are installed, as depicted in FIG. 3, at the inlet and the outlet of the filter to measure both the pressure difference and the filtration efficiency.

To determine the filtration efficiency, iron particles as impurities were added to the vessel containing oil and mixed together. The contaminated oil is maintained at 80° C. and circulated through the filter at a flow rate of 3 liter/min for 6 hours. Thereafter, the amount of the iron contained in the oil thus passed was measured by a particle quantifier PQ 90 which is commercially available from Analex Co., U.K. The filtration efficiency is calculated according to the following equation.

$$\text{Filtration efficiency (\%)} = \frac{I - I'}{I} \times 100$$

wherein, I is a particle index of the iron component which is initially contained in the oil; and I' is a particle index of the iron contained in the oil passing through the filter.

DESCRIPTION OF THE PREFERRED EMBODIMENTS

The present invention will be illustrated in greater detail by way of the following examples. The examples are presented for illustrative purpose only and should not be construed as limiting the invention which is properly delineated in the claims.

EXAMPLE 1

95 Percent by weight of polyethylene having a molecular weight of 20,000 in the form of a chip was mixed with 5% by weight of strontium ferrite. The resulting mixture was spray spun onto a collection mandrel having a diameter of 23 cm under operating conditions, extrudate temperature of 170° C., spray head temperature of 350° C., screw revolution frequency of 15 rpm, air temperature and pressure of 100° C. and 5 kPa, and distance between extruder and collector of 15 cm. The cylindrical, self-bonded, nonwoven fibrous structure was formed in a fiber diameter of 0.03 mm and density of 0.7 gram per cubic centimeter, and fabricated into a hollow cylinder having an outer diameter of 28 cm, an inner diameter of 23 cm and a height of 5 cm. The hollow cylinder was then magnetized in a magnetizer to produce an air filter specimen.

The specimen was compared with a control paper filter commercially available from Allied Singnal Inc., U.S.A. with respect to the leakage percentages thereof according to the procedures described above. The results are shown in Table 1 below.

TABLE 1

|  | Leakage percentage (%) Air velocity (m/min) | |
| --- | --- | --- |
|  | 2.1 | 4.6 |
| The invention | 0.24 | 0.35 |
| Control | 0.46 | 0.58 |

EXAMPLE 2

90 Percent by weight of polypropylene having a molecular weight of 50,000 in the form of a chip and 10% by weight of strontium ferrite were mixed and spray spun onto a planar collector having 30 cm×30 cm target size and roller winding system under operating conditions, extrudate temperature of 190° C. spray head temperature of 340° C., screw revolution frequency of 20 rpm, air temperature and pressure of 70° C. and 10 kPa, and the distance of 15 cm. The planar, self-bonded, nonwoven fibrous structure having a fiber diameter of 0.04 mm and an air permeability of 10 m³/min/m² was formed and fabricated into a sheet form of 11.4 cm×16.5 cm in size and then magnetized in a magnetizer to produce a filter specimen.

The specimen was compared with a control polypropylene filter having the same air permeability but without containing strontium ferrite with respect to the leakage percentages thereof according to the procedures described above. The results are shown in Table 2 below.

TABLE 2

|  | Leakage percentage (%) Air velocity (m/min) | |
| --- | --- | --- |
|  | 2.1 | 4.6 |
| The invention | 0.20 | 0.31 |
| Control | 0.35 | 0.47 |

EXAMPLE 3

95 Percent by weight of polyester having a molecular weight of 40,000 in the form of a chip was mixed with 5 percent by weight of barium ferrite. The resulting mixture was spray spun onto a planar collector having the same system in Example 2 under operating conditions, extrudate temperature of 270° C., spray head temperature of 380° C., screw revolution frequency of 20 rpm, air temperature and pressure of 100° C. and 20 kPa, and the distance of 25 cm.

The planar, self-bonded, nonwoven fibrous structure having a fiber diameter of 0.02 mm and an air permeability of 20 m³/min/m² was formed and fabricated into a sheet form of 11.4 cm×16.5 cm in size, and then magnetized in a magnetizer to produce a filter specimen.

The specimen was compared with a control polyester filter having the same air permeability but without containing barium ferrite with respect to the leakage percentages thereof according to the procedures described above. The results are shown in Table 3 below.

TABLE 3

|  | Leakage percentage (%) Air velocity (m/min) | |
| --- | --- | --- |
|  | 2.1 | 4.6 |
| The invention | 0.06 | 0.18 |
| Control | 0.12 | 0.40 |

EXAMPLE 4

80 Percent by weight of powdered polytetrafluoroethylene having a molecular weight of 1,500,000 and 20% by weight of samarium-cobalt were mixed and spray spun onto a planar collector having the same system in Example 2 under operating conditions, extrudate temperature of 350° C., spray head temperature of 450° C., screw revolution frequency of 10 rpm, air temperature and pressure of 200° C. and 30 kPa, and the distance of 30 cm. The planar, self-bonded, nonwoven fibrous structure having a fiber diameter of 0.01 mm and an air permeability of 15 m³/min/m² was formed and fabricated into a sheet form of 11.4 cm×16.5 cm in size, and then magnetized in a magnetizer to produce a filter specimen.

The specimen was compared with a control polytetrafluoroethylene filter having the same air permeability but without containing samarium-cobalt with respect to the leakage percentages thereof according to the procedures described above. The results are shown in Table 4 below.

TABLE 4

|  | Leakage percentage (%) Air velocity (m/min) | |
| --- | --- | --- |
|  | 2.1 | 4.6 |
| The invention | 0.08 | 0.25 |
| Control | 0.10 | 0.42 |

EXAMPLE 5

70 Percent by weight of polyamide in the form of a chip (Nylon 6; molecular weight: 3,000) and 30% by weight of strontium ferrite were mixed and spray spun onto a collection mandrel having a diameter of 4 cm under operating conditions, extrudate temperature of 230° C., spray head temperature of 390° C., screw revolution frequency of 20 rpm, air temperature and pressure of 150° C. and 30 kPa, and the distance of 30 cm. The cylindrical, self-bonded, nonwoven fibrous structure having a fiber diameter of 0.02 mm and density of 0.6 gram per cubic centimeter was formed and fabricated into a hollow cylinder having an outer diameter of 8 cm, an inner diameter of 4 cm and a length of 4 cm, and then magnetized in a magnetizer to produce an oil filter specimen.

The specimen was compared with a control pleated paper oil filter commercially available from Dard Co., U.S.A. with respect to the filtration efficiencies thereof according to the procedures described above.

Figure 4:
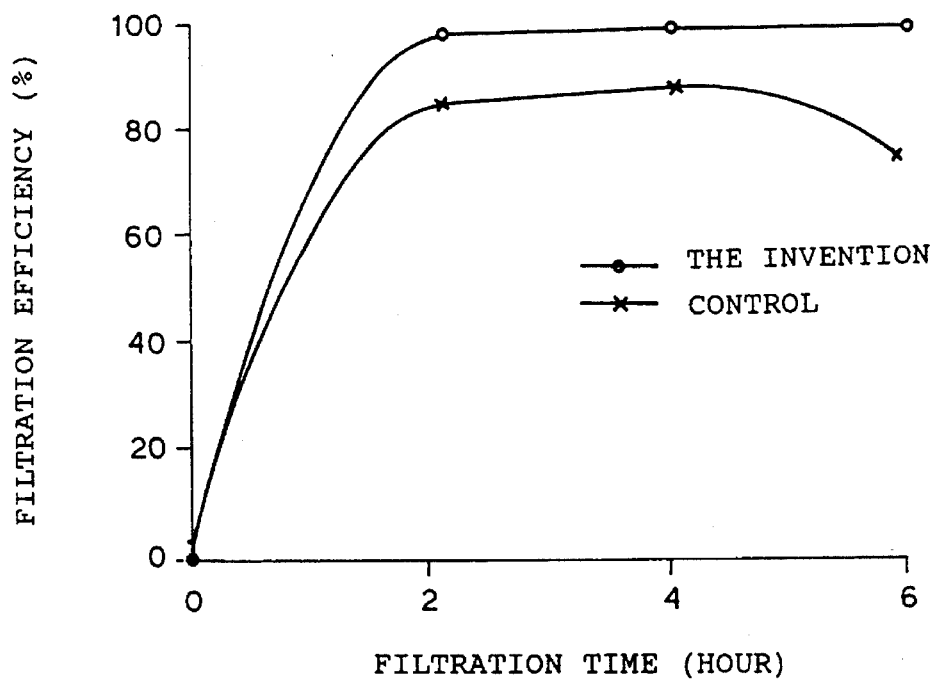
FIG. 4 is a graph showing the change in the filtration efficiency of an oil filter with the lapse of filtration time.
Figure 5:
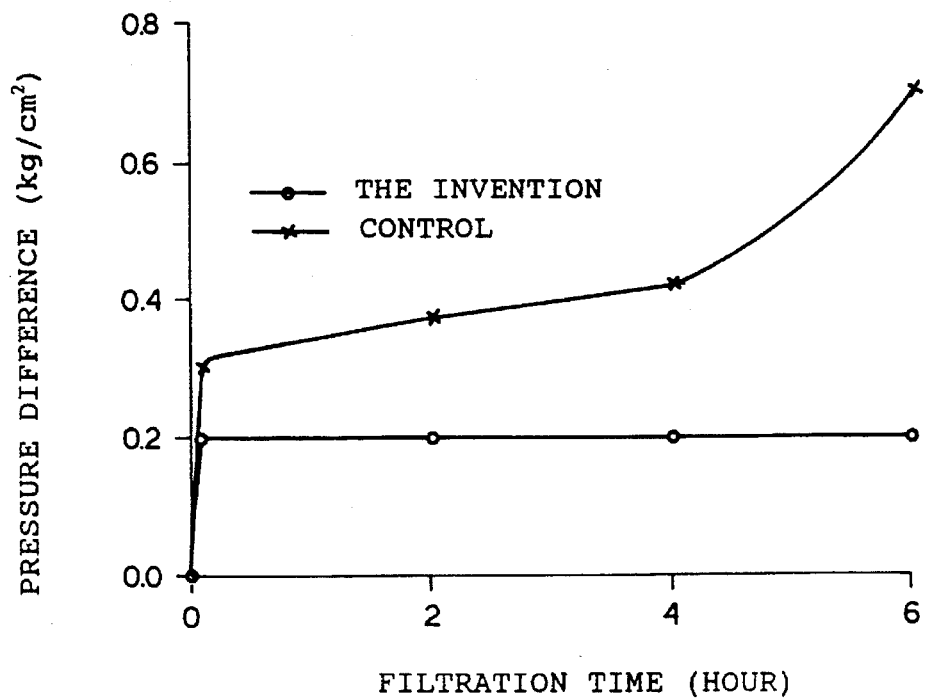
FIG. 5 is a graph showing the change in the pressure difference of an oil filter with the lapse of filtration time.

The results are illustrated in FIGS. 4 and 5 which show the change in the filtration efficiency and the pressure difference with the filtration time, respectively.

The graphs of FIGS. 4 and 5 confirm that the magnetic filter of the present invention has been considerably improved in its filtration efficiency while maintaining a low pressure difference compared with the conventional paper oil filter.

EXAMPLE 6

80 Percent by weight of polyimide having a molecular weight of 20,000 in the form of a chip and 20 percent by weight of barium ferrite were mixed and spray spun onto a collection mandrel having a diameter of 4 cm under operating conditions, extrudate temperature of 300° C., spray head temperature of 450° C., screw revolution, frequency of 25 rpm, air temperature and pressure of 170° C. and 25 kPa, and the distance of 25 cm. The cylindrical, self-bonded, nonwoven fibrous structure having a fiber diameter of 0.03 mm and density of 0.5 gram per cubic centimeter was formed and fabricated into a hollow cylinder of an outer diameter of 8 cm, an inner diameter of 4 cm and a height of 5 cm, and then magnetized in a magnetizer to produce an oil filter specimen.

The specimen was compared with a control pleated paper oil filter commercially available from Hyundai Motor Co., Korea with respect to the filtration efficiencies thereof by subjecting them to a filtration test for 6 hours according to the procedures described above. The results are shown in Table 5 below.

TABLE 5

|  | Pressure difference (Kg/cm²) | Filtration efficiency (%) |
| --- | --- | --- |
| The invention | 0.26 | 99.5 |
| Control | 0.70 | 73.8 |

EXAMPLE 7

85 Percent by weight powdered polycarbonate having a molecular weight of 20,000 and 15% by weight of samarium-cobalt were mixed and spray spun onto a collection mandrel having a diameter of 10 cm under operating conditions, extrudate temperature of 250° C., spray head temperature of 420° C., screw revolution frequency of 15 rpm, air temperature and pressure of 100° C. and 10 kPa, and the distance of 15 cm. The cylindrical, self-bonded, nonwoven fibrous structure having a fiber diameter of 0.04 mm and density of 0.45 gram per cubic centimeter was formed and fabricated into a hollow cylinder having a size of 16 cm in outer diameter, 10 cm in inner diameter and 30 cm in length, and then magnetized in a magnetizer to produce an oil filter specimen.

The specimen was compared with a control tissue oil filter of 10,000 Power commercially available from Aekuk Industries, Co., Korea with respect to the filtration efficiencies thereof by subjecting them to a filtration test for 6 hours according to the procedures described above. The results are shown in Table 6 below.

TABLE 6

|  | Pressure difference (Kg/cm$^2$) | Filtration efficiency (%) |
|---|---|---|
| The invention | 0.34 | 96.7 |
| Control | 0.58 | 85.2 |

What is claimed is:

1. A magnetic filter material which is made of a spray-spun planar or cylindrical, self-bonded, nonwoven structure comprising randomly arranged substantially continuous fibrous material, consisting essentially of 40 to 99% by weight of a polymer selected from the group consisting of polycarbonate, polyethylene, polypropylene, polyamide, polyimide, polyester, polytetrafluoroethylene and polyacrylonitrile and 1 to 60% by weight of a magnetic substance selected from the group consisting of barium ferrite, strontium ferrite, and samarium-cobalt.

2. The magnetic polymer filter material having a nonwoven fibrous structure according to claim 1, wherein the polymer is contained in an amount of 60 to 98% by weight and the magnetic substance is contained in an amount of 2 to 40% by weight.

3. The magnetic filter material according to claim 1, wherein the polycarbonate is an aromatic polycarbonate having a molecular weight of 10,000 to 30,000; the polyethylene is a high-density polyethylene having a molecular weight of 10,000 to 50,000 and a density of 0.94 to 0.96 g/cm$^3$; the polytetrafluoroethylene is polytetrafluoroethylene having a molecular weight of 500,000 to 3,000,000; the polypropylene is a polypropylene homopolymer having a molecular weight of 40,000 to 60,000 and a density of 0.94 g/cm$^3$; the polyamide is Nylon 6 having a molecular weight of 1,000 to 5,000 or Nylon 6.6 having a molecular weight of 10,000 to 40,000; the polyimide is an aromatic polyimide having a molecular weight of 10,000 to 40,000; the polyester is polyester having a molecular weight of 15,000 to 45,000; and the polyacrylonitrile is polyacrylonitrile having a molecular weight of 20,000 to 50,000.

4. The magnetic filter material according to claim 2, wherein the polycarbonate is an aromatic polycarbonate having a molecular weight of 10,000 to 30,000; the polyethylene is a high-density polyethylene having a molecular weight of 10,000 to 50,000 and a density of 0.94 to 0.96 g/cm$^3$; the polytetrafluoroethylene is polytetrafluoroethylene having a molecular weight of 500,000 to 3,000,000; the polypropylene is a polypropylene homopolymer having a molecular weight of 40,000 to 60,000 and a density of 0.94 g/cm$^3$; the polyamide is Nylon 6 having a molecular weight of 1,000 to 5,000 or Nylon 6.6 having a molecular weight of 10,000 to 40,000; the polyimide is an aromatic polyimide having a molecular weight of 10,000 to 40,000; the polyester is polyester having a molecular weight of 15,000 to 45,000; and the polyacrylonitrile is polyacrylonitrile having a molecular weight of 20,000 to 50,000.

5. The magnetic filter material according to claim 1, wherein the fibrous structure of the filter material has a composition selected from the group consisting of:

95% by weight of polyethylene and 5% by weight of strontium ferrite;

90% by weight of polypropylene and 10% by weight of strontium ferrite;

95% by weight of polyester and 5% by weight of barium ferrite;

80% by weight of polytetrafluoroethylene and 20% by weight of samarium-cobalt;

70% by weight of polyamide and 30% by weight of strontium ferrite;

80% by weight of polyimide and 20% by weight of barium ferrite; and

85% by weight of polycarbonate and 15% by weight of samarium-cobalt.

6. The magnetic filter material according to claim 1, wherein the magnetic filter material is spray spun and collected in the form of sheets or hollow cylinders, which is made of a self-bonded, nonwoven fibrous structure having a pore size of 0.1 to 200 μm and a fiber diameter of 0.01 to 1.0 mm, and then magnetized.

* * * * *